US009248390B2

(12) United States Patent
Hudgens et al.

(10) Patent No.: US 9,248,390 B2
(45) Date of Patent: Feb. 2, 2016

(54) FILTER SYSTEM AND FILTRATION METHOD FOR FLUID RESERVOIRS

(71) Applicant: Caterpillar Inc., Peoria, IL (US)

(72) Inventors: Jason W. Hudgens, Washington, IL (US); Theron J. Cassidy, Peoria, IL (US); Jeffrey R. Ries, Metamore, IL (US); Lynsey Hart, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 15 days.

(21) Appl. No.: 14/171,409

(22) Filed: Feb. 3, 2014

(65) Prior Publication Data

US 2015/0198071 A1      Jul. 16, 2015

Related U.S. Application Data

(63) Continuation-in-part of application No. 14/154,387, filed on Jan. 14, 2014.

(51) Int. Cl.
| | |
|---|---|
| *B01D 50/00* | (2006.01) |
| *B01D 59/50* | (2006.01) |
| *B01D 35/30* | (2006.01) |
| *B01D 29/56* | (2006.01) |
| *B01D 29/11* | (2006.01) |
| *F01N 3/20* | (2006.01) |
| *B01D 35/027* | (2006.01) |

(52) U.S. Cl.
CPC ............. *B01D 35/30* (2013.01); *B01D 29/117* (2013.01); *B01D 29/56* (2013.01); *B01D 35/0276* (2013.01); *F01N 3/2066* (2013.01); *F01N 2610/02* (2013.01); *F01N 2610/10* (2013.01); *F01N 2610/1413* (2013.01); *F01N 2610/1426* (2013.01); *F01N 2610/1466* (2013.01)

(58) Field of Classification Search
CPC .... B01D 35/0273; B01D 35/26; B01D 35/27; F02M 37/106; F02M 37/22
See application file for complete search history.

(56) References Cited

U.S. PATENT DOCUMENTS

| | | | | | |
|---|---|---|---|---|---|
| 3,768,730 | A | * | 10/1973 | Campbell | F02M 31/16 123/557 |
| 4,343,283 | A | * | 8/1982 | Shepherd | F02M 31/16 123/514 |
| 4,385,615 | A | * | 5/1983 | Keane | F02D 19/0647 123/514 |
| 4,571,481 | A | * | 2/1986 | Leary | F02M 31/125 123/549 |
| 4,624,779 | A | * | 11/1986 | Hurner | B01D 17/0208 210/180 |
| 4,684,786 | A | * | 8/1987 | Mann | F02M 31/125 123/549 |
| 4,748,961 | A | * | 6/1988 | Headley | F02M 25/00 123/525 |

(Continued)

FOREIGN PATENT DOCUMENTS

| | | |
|---|---|---|
| DE | 202011002684 U1 | 5/2012 |
| DE | 102011075422 A1 | 11/2012 |
| EP | 1410968 | 4/2004 |

*Primary Examiner* — Amber R Orlando
(74) *Attorney, Agent, or Firm* — Leydig, Voit & Mayer, Ltd.

(57) ABSTRACT

A fluid delivery system includes a fluid reservoir having an inlet screen and a main reservoir filter. The fluid reservoir is adapted to enclose a fluid therewithin and includes a reservoir body forming a reservoir volume that is fluidly connected to an inlet conduit, a supply conduit, and a return conduit. The inlet screen is disposed fluidly along the inlet conduit and adapted to filter a fluid provided to fill the reservoir through the inlet conduit. The main reservoir filter is disposed fluidly along the supply conduit and adapted to filter a fluid drawn from the reservoir volume and provided through the supply conduit to a pump.

5 Claims, 11 Drawing Sheets

(56) References Cited

U.S. PATENT DOCUMENTS

| | | | | |
|---|---|---|---|---|
| 4,858,584 A * | 8/1989 | Bridgeman | F02M 31/16 123/557 |
| 4,933,093 A * | 6/1990 | Keller | B01D 17/0208 123/512 |
| 5,029,634 A * | 7/1991 | Hurner | B67D 7/80 123/142.5 R |
| 5,103,793 A * | 4/1992 | Riese | F02M 37/08 123/509 |
| 5,135,044 A * | 8/1992 | Hurner | B67D 7/80 123/557 |
| 5,355,860 A * | 10/1994 | Ekstam | B01D 36/003 123/510 |
| 5,423,373 A * | 6/1995 | Ramberg | F02M 31/10 123/142.5 R |
| 5,443,053 A * | 8/1995 | Johnson | F02M 31/16 123/557 |
| 5,596,973 A * | 1/1997 | Grice | F02M 31/10 123/557 |
| 5,611,392 A * | 3/1997 | Malecek | F01P 3/20 123/142.5 R |
| 5,776,332 A * | 7/1998 | Hurner | B01D 29/114 210/260 |
| 5,797,378 A * | 8/1998 | Kato | F02B 61/045 123/198 E |
| 6,055,962 A * | 5/2000 | Kirk | F02M 37/02 123/516 |
| 6,245,229 B1 | 6/2001 | Kool et al. | |
| 6,314,947 B1 * | 11/2001 | Roche | F02M 37/10 123/497 |
| 6,833,070 B2 * | 12/2004 | Fischer | B01D 35/0273 210/232 |
| 6,839,508 B2 * | 1/2005 | Biess | F02M 31/125 123/549 |
| 7,216,614 B2 * | 5/2007 | Shibata | F02D 33/006 123/179.17 |
| 8,301,020 B2 * | 10/2012 | Wildegger | B60S 1/487 219/205 |
| 8,523,018 B2 | 9/2013 | Wilkins | |
| 8,707,934 B2 * | 4/2014 | Rowley | F02M 27/02 123/538 |
| 2007/0079606 A1 | 4/2007 | Ehlers | |
| 2010/0200107 A1 | 8/2010 | Weathers et al. | |
| 2010/0206793 A1 * | 8/2010 | Oku | B01D 29/114 210/172.4 |
| 2011/0138791 A1 | 6/2011 | Li et al. | |
| 2011/0283689 A1 | 11/2011 | Wilkins | |
| 2012/0160934 A1 | 6/2012 | Ponnathpur | |
| 2012/0186677 A1 | 7/2012 | Wetzel et al. | |
| 2013/0199979 A1 | 8/2013 | Jauss et al. | |

* cited by examiner

FILTER SYSTEM AND FILTRATION METHOD FOR FLUID RESERVOIRS

CROSS-REFERENCE TO RELATED APPLICATIONS

This patent application is a continuation-in-part of co-pending U.S. patent application Ser. No. 14/154,387, filed Jan. 14, 2014.

TECHNICAL FIELD

This disclosure relates generally to diesel exhaust fluid delivery systems used in association with engine emission control systems and, more particularly, a filter system and filtration method for use with urea delivery systems.

BACKGROUND

One known method for abating certain diesel engine exhaust constituents is by use of an exhaust after-treatment system that utilizes Selective Catalytic Reduction (SCR) of nitrogen oxides. In a typical SCR system, diesel exhaust fluid (DEF), which may include urea or a urea-based water solution, is mixed with exhaust gas before being provided to an appropriate catalyst. In some applications, the DEF is injected directly into an exhaust passage through a specialized injector device. In the case of urea, the injected DEF mixes with exhaust gas and breaks down to provide ammonia ($NH_3$) in the exhaust stream. The ammonia then reacts with nitrogen oxides ($NO_x$) in the exhaust at a catalyst to provide nitrogen gas ($N_2$) and water ($H_2O$).

As can be appreciated, SCR systems require the presence of some form of DEF sufficiently close to the engine system such that the engine can be continuously supplied during operation. Various DEF delivery systems are known and used in engine applications. In known DEF injection systems, a reservoir is installed onto a vehicle for containing the DEF, which is drawn from the reservoir and delivered in metered amounts to the engine exhaust system. The reservoir has a finite urea capacity such that periodic replenishment of the DEF within the reservoir is required. In certain applications, such as mining, construction, farming and other field applications, DEF replenishment may be carried out in the work environment of the machine. Such refilling or replenishment operations are typically carried out by dispensing DEF into the reservoir through a removable reservoir cap. As can be appreciated, dirt and other debris may fall within the reservoir, especially during a refilling operation, which may present problems if the dirt and/or other debris is ingested into a pump drawing DEF from the reservoir, and/or is delivered with the DEF to the DEF injector, which typically has close clearances and small injection orifices that can bind or become plugged by the debris.

In the past, various solutions have been proposed to mitigate the presence of debris within a DEF container. Most such solutions propose adding filtering media to a fill opening of the container, or adding filters in line with a DEF supply line within the system at a location upstream of a DEF pump and/or before the DEF injector. However, such known solutions present certain challenges. For example, a filter disposed at an inlet of the container may impede the rapid filling of the container, which is desired, especially since a lengthy filling process may rob the machine of profitable time in service. Moreover, the aqueous components of DEF fluids are susceptible to thermal effects such as breakdown at high temperatures or freezing at low temperatures, which makes their presence in lengthy in-line supply conduits and/or filters undesirable due to crystallization effects and/or freezing within the filter. Such conditions, which require the addition of heaters and/or other temperature control devices to be added to DEF supply systems increase the cost and complexity of those systems.

SUMMARY

The disclosure describes, in one aspect, a fluid delivery system. The fluid delivery system includes a fluid reservoir having an inlet screen and a main reservoir filter. The fluid reservoir is adapted to enclose a fluid therewithin and includes a reservoir body forming a reservoir volume that is fluidly connected to an inlet conduit, a supply conduit, and a return conduit. The inlet screen is disposed fluidly along the inlet conduit and adapted to filter a fluid provided to fill the reservoir through the inlet conduit. The main reservoir filter is disposed fluidly along the supply conduit and adapted to filter a fluid drawn from the reservoir volume and provided through the supply conduit to a pump.

In another aspect, the disclosure describes a diesel exhaust fluid (DEF) reservoir for use with an exhaust after-treatment system of an internal combustion engine. The DEF reservoir includes a reservoir body forming a reservoir volume and a header opening that is fluidly open to the reservoir volume. A header is connected to the reservoir body and disposed to seal the header opening. A heater is connected to the header and disposed within the reservoir volume and adapted to be immersed in the DEF. A DEF draw conduit is connected to the header and extends through the header between a sump location, which is within the reservoir volume and adjacent to the heater, and a DEF draw port, which is disposed external to the reservoir body and fluidly connected to a DEF pump. A bag filter is connected to the header. The bag filter completely encloses the heater and the sump location of the DEF draw conduit within the reservoir volume such that, when DEF is drawn from the reservoir volume through the sump location, said DEF is first filtered by the bag filter. A secondary reservoir filter is disposed within the bag filter and arranged to cover the DEF draw port at the sump location. A fill opening screen is disposed to cover a fill opening formed in the reservoir body.

In yet another aspect, the disclosure describes a method for storing and delivering fluid to an after-treatment system associated with an engine. The method includes containing the fluid within a reservoir volume formed within a reservoir, drawing fluid from the reservoir through a supply conduit, filling the reservoir with fluid though an inlet conduit, and returning fluid to the reservoir through a return conduit. Fluid added to the reservoir is screened through the inlet conduit with an inlet screen placed in fluid connection along the inlet conduit between a fill opening and the reservoir volume. Fluid drawn from the fluid reservoir is filtered with a main reservoir filter placed fluidly along the supply conduit. Fluid drawn from the fluid reservoir is delivered through the supply conduit to a pump, which returns unused fluid to the reservoir through the return conduit.

DETAILED DESCRIPTION

This disclosure relates to emission control systems for machines and, more particularly, to DEF filtering systems for use with SCR-based after-treatment systems for diesel engines used on stationary or mobile machines. The machines contemplated in the present disclosure can be used in a variety of applications and environments. For example, any machine that performs some type of operation associated with an industry such as mining, construction, farming, transportation, marine or any other industry known in the art is contemplated. For example, the type of machine contemplated herein may be an earth-moving machine, such as a wheel loader, excavator, dump truck, backhoe, material handler, locomotive, paver or the like. Apart from mobile machines, the machine contemplated may be a stationary or portable machine such as a generator set, an engine driving a gas compressor or pump, and the like. Moreover, the machine may include or be associated with work implements such as those utilized and employed for a variety of tasks, including, for example, loading, compacting, lifting, brushing, and include, for example, buckets, compactors, forked lifting devices, brushes, grapples, cutters, shears, blades, breakers/hammers, augers, and others.

Figure 2:
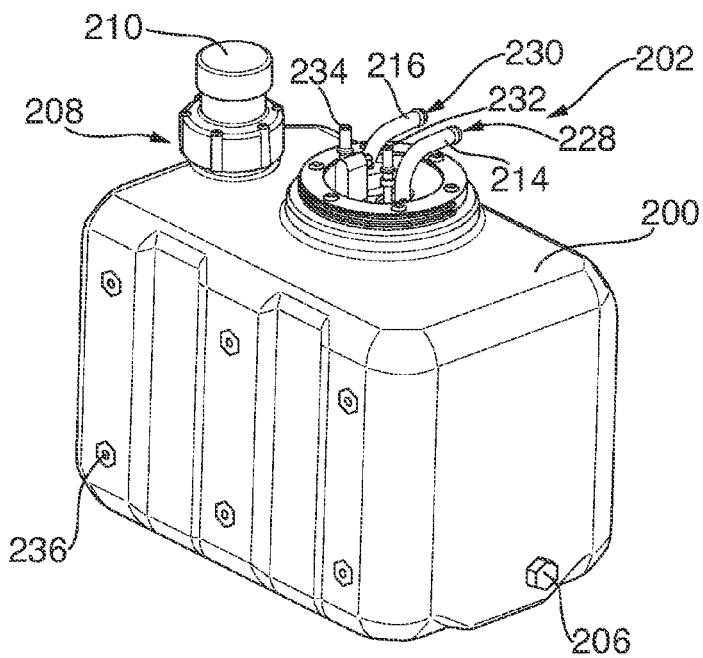
FIG. 2 is an outline view of a DEF reservoir in accordance with the disclosure.

FIG. 2 is a block diagram of an exhaust after-treatment system 101 associated with an engine 102 of a machine 100. The system 101 may be modularly packaged as shown in the illustrated embodiment for retrofit onto existing engines or, alternatively, for installation on new engines. In the illustrated embodiment, the system 101 includes a first module 104 that is fluidly connected to an exhaust conduit 106 of the engine 102. During engine operation, the first module 104 is arranged to internally receive engine exhaust gas from the conduit 106. The first module 104 may contain various exhaust gas treatment devices such as a diesel oxidation catalyst (DOC) 108 and a diesel particulate filter (DPF) 110, but other devices may be used. The first module 104 and the components found therein are optional and may be omitted for various engine applications in which the exhaust-treatment function provided by the first module 104 is not required. In the illustrated embodiment, exhaust gas provided to the first module 104 by the engine 102 may first pass through the DOC 108 and then through the DPF 110 before entering a transfer conduit 112.

The transfer conduit 112 fluidly interconnects the first module 104 with a second module 114 such that exhaust gas from the engine 102 may pass through the first and second modules 104 and 114 in series before being released at a stack 120 that is connected to the second module. In the illustrated embodiment, the second module 114 encloses a SCR catalyst 116 and an Ammonia Oxidation Catalyst (AMOX) 118. The SCR catalyst 116 and AMOX 118 operate to treat exhaust gas from the engine 102 in the presence of ammonia, which is provided after degradation of a urea-containing solution injected into the exhaust gas in the transfer conduit 112.

More specifically, a urea-containing water solution, which is commonly referred to as diesel exhaust fluid (DEF) 121, is injected into the transfer conduit 112 by a DEF injector 122. The DEF 121 is contained within a reservoir 128 and is provided to the DEF injector 122 by a pump 126. As the DEF 121 is injected into the transfer conduit 112, it mixes with exhaust gas passing therethrough and is carried to the second module 114. To promote mixing of DEF with exhaust, a mixer 124 may be disposed along the transfer conduit 112.

As can be appreciated, the location of the DEF injector 122 on the transfer conduit 112 can expose the injector to relatively high temperatures due to heating from exhaust gas during operation. In the illustrated exemplary embodiment, a flow of engine coolant is provided through the injector, but such coolant flow is optional.

One issue that may arise during operation is ingestion of dirt and/or other debris that may be found within the reservoir 128. Because urea may freeze, the inlet port within the reservoir 128 and other similar reservoirs is close to the bottom of the reservoir such that liquid urea may be drawn even if frozen urea is still present and floating in the reservoir when operation of the engine 102 starts and a heater disposed within the reservoir has not yet melted the entire amount of urea held in the reservoir. However, drawing liquid from the bottom of the reservoir 128 for this reason also makes the system more susceptible to ingestion of debris, dirt or other contaminants that may be present within the reservoir, for example, by falling into the reservoir through a fill-port opening during a filling operation.

Figure 1:
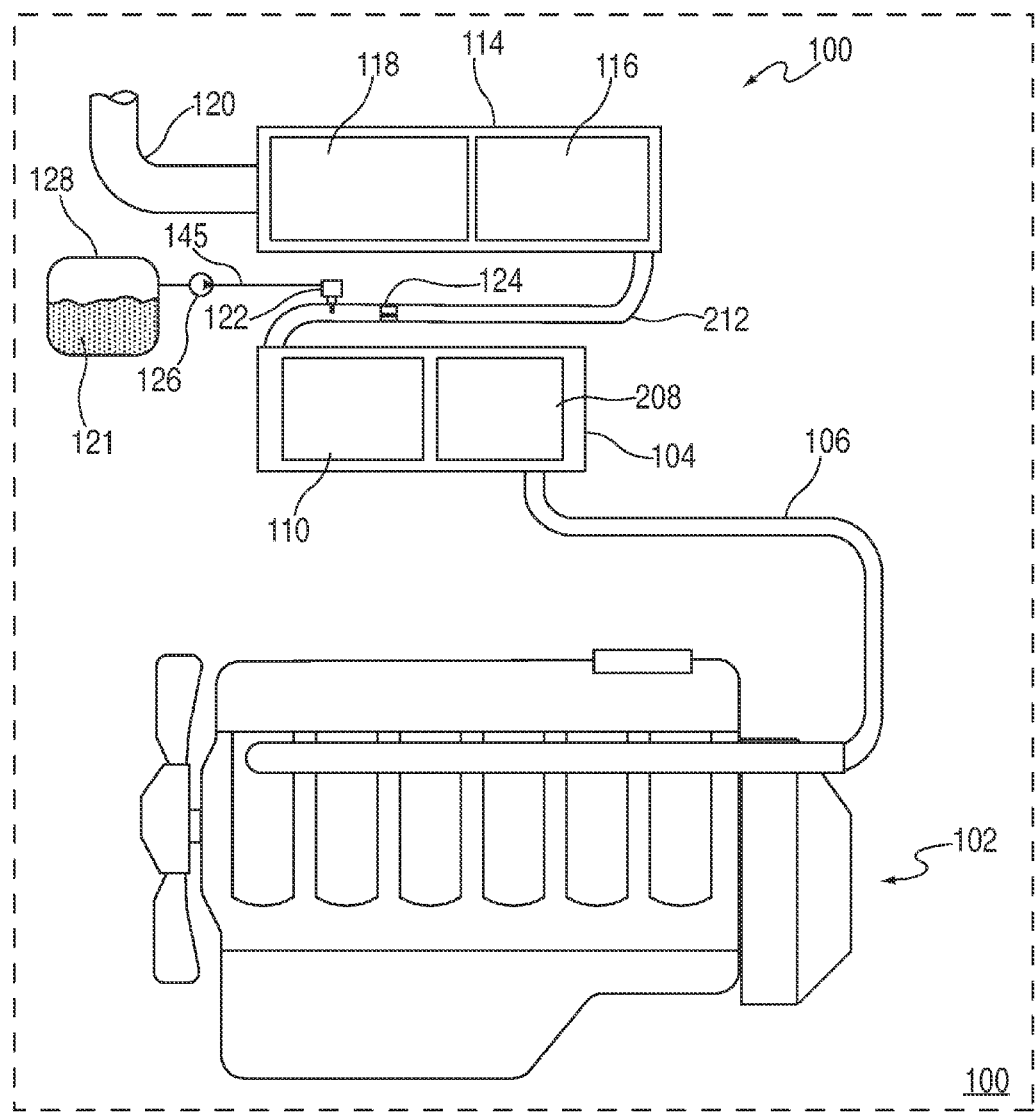
FIG. 1 is a block diagram of an engine having a SCR system in accordance with the disclosure.
Figure 3:
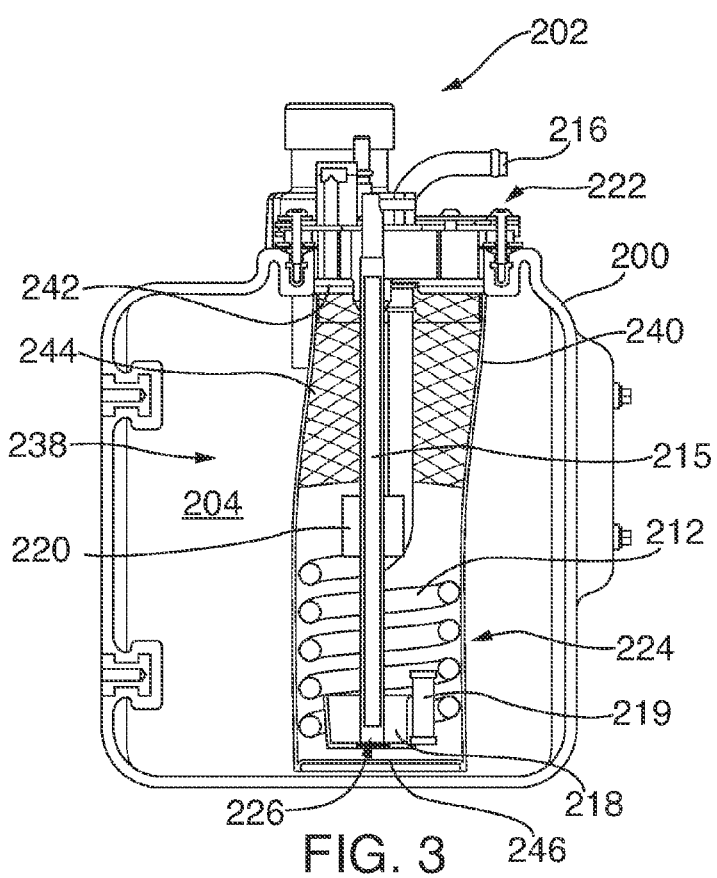
FIG. 3 is a fragmentary view thereof.

One embodiment for a filter mechanism for use in a DEF reservoir 200 is shown in FIGS. 2 and 3. The DEF reservoir 200 is suitable for use with an engine, for example, the engine 102 having a DEF reservoir 128 as shown in FIG. 1. In this embodiment, FIG. 2 illustrates DEF reservoir 200 having a header assembly 202 installed therein. FIG. 3 is a cross section of the DEF reservoir 200 to reveal internal components and features. In reference to these figures, the DEF reservoir 200 shown is a single-piece molded plastic structure defining a reservoir volume 204 that is fluidly accessible via a drain plug 206 and a fill opening 208, which is sealed by a fill cap 210. The header assembly 202 includes a heater device 212, a DEF supply port 214 connected to a supply tube 215, and a DEF return port 216. The DEF header assembly 202 further includes a sump 218 having an inlet filter 219 and connected at a free end of the supply tube 215, and a DEF level sensor 220 disposed on a sensor rod 221 (best shown in FIG. 4), which in the figures is embodied as a float-level sensor device.

In the header assembly 202 of the embodiment shown, the heater device 212 is a liquid-to-liquid heat exchanger that uses heat provided by a flow of warm engine coolant to thaw frozen DEF fluid in the reservoir 200. Although a coolant-operated heater is shown, other types of heaters such as electrically powered or exhaust-gas heat powered heaters, to name a few, may be used. The coolant-operated heater includes a coolant inlet conduit 228 that supplies warmed coolant from an engine, for example, the engine 102 (FIG. 1), to a helical element or coil 224, which is disposed within the reservoir volume 204 and in contact with the DEF fluid therein. Coolant provided through the coolant inlet conduit 228 passes through the coil 224, thus heating the DEF fluid. From the coil 224, the flow of coolant may return to the engine through a coolant outlet conduit 230.

The header assembly 202 further includes DEF supply and return ports 232 and 234, respectively. The DEF supply port 232 is fluidly connected to the supply tube 215 and may be connected to a DEF pump inlet (not shown), for example, the pump 126 (FIG. 1), such that DEF can be drawn from the reservoir 200. The pump may be configured to provide metered amounts of DEF to the DEF injector 122 (FIG. 1), and return unused DEF to the reservoir 200 via the DEF return port 234. Therefore, in the illustrated embodiment, all functional fluid exchanges with the DEF reservoir 200 can be accomplished through the DEF header 202. The DEF reservoir 200 may further include mounting bosses 236 for attachment of the same to a vehicle or other structure.

In the illustrated embodiment, the header assembly 202 is installed through a header opening 222 formed in the DEF reservoir 200 such that at least the heater device 212, supply tube 215, and sensor 220, are disposed within the reservoir volume 204. As shown, the coil 224 of the heater 212 and a supply inlet 226 of the tube 215 are present within the reservoir volume 204 and close to a bottom portion thereof such that DEF fluid present in the reservoir volume 204 may be reliably warmed and drawn from the reservoir 200 during operation. However, as can be appreciated, any debris and/or dirt that may be present within the reservoir volume 204 as previously described may also be present, at higher concentrations, close to the bottom of the reservoir 200 when the same is installed upright, as shown, by virtue of gravity and by settlement. For at least this reason, various filters are used to ensure that a minimal amount to no debris is ingested in the tube 215, as will be described hereafter.

In the illustrated embodiment, two filtering stages are used to remove debris and/or ice crystals that may be present within the reservoir 200. For example, as previously discussed, icing of the DEF during cold-soak conditions may require heating by the heater 212 prior to and during operation. However, there may be conditions during operation where the DEF in the reservoir 200 is not fully melted and, combined with vehicle motion, may create a transitional condition of melted with solid DEF, which can be referred to as a slush condition. In these conditions, to avoid clogging of the inlet tube 215 by ice particles, the inlet filter 219 may be used. In the illustrated embodiment, the inlet filter 219 may have a relatively large filtration porosity compared to the fine dirt or silt that may be present in the reservoir 200, but a porosity that is also suitable for reducing, or preferably avoiding altogether, ice accumulation within the sump 218 at around the inlet 226 of the supply tube 215. The porosity of the inlet filter 219 may be selected depending on the type of DEF fluid used. In the illustrated embodiment, the inlet filter has a porosity of about 100 μm, but other porosities may be used such as porosities within the range of about 20 μm to about 150 μm. For the inlet filter 219, a larger porosity may be preferred, if sufficient to discourage ice accumulation in the supply tube 215, to reduce a pressure drop at the inlet of the inlet tube 215.

Figure 4:
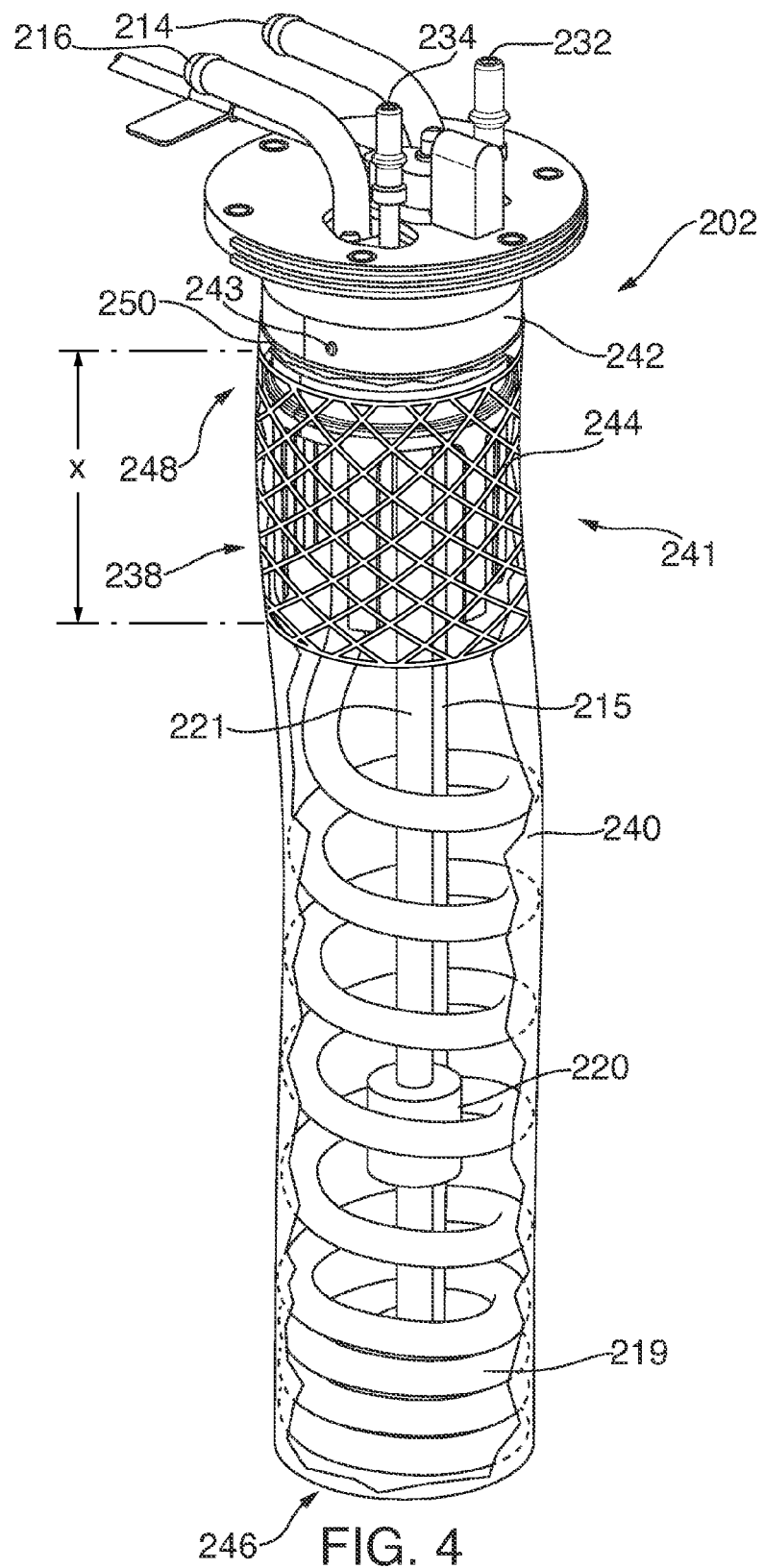
FIG. 4 is an outline view of a DEF header assembly having a filter assembly installed thereon in accordance with the disclosure.

The relatively large porosity of the inlet filter 219 is acceptable because the inlet filter 219 operates as a second-stage filter that is unlikely to encounter considerable amounts of debris from the reservoir volume 204. A main filter assembly 238 is disposed around and substantially encloses the portion of the header assembly 202 that is exposed to DEF within the reservoir volume 204. An outline view of the header assembly 202 withdrawn from the reservoir 200 for illustration is shown in FIG. 4. In reference to FIGS. 2-4, where like elements are denoted by like reference numerals for simplicity, the main filter assembly 238 encloses the inlet tube 215 and its inlet 226, sump 218, inlet filter 219, heater coil 212, level sensor 220 and other areas of the header assembly 202. The main filter assembly 238 includes a bag filter 240 and an attachment or mounting collar 242. In certain embodiments, a filter carrier 244 or mesh can also be used to help the bag filter 240 retain its shape during service and not collapse, especially while DEF fluid is drawn from within the filter.

In the illustrated embodiments, the bag filter 240 is made of a layer of polypropylene felt fabric or material, having a porosity of about 30 μm to 40 μm. The porosity of the bag filter 240 depends on the size of the debris expected to be present in the reservoir, and can change accordingly to be any size, although it may generally be expected for the porosity to be between 1 μm and 50 μm. As shown, the polypropylene felt has a inner, glazed side, and an outer, untreated or unglazed side with a felt feel, which increases the external area of the filter for trapping debris that may be moving around within the reservoir volume 204 but that does not introduce loose fibers or debris from the filter on the internal, filtered side thereof. In certain embodiments, fabrics having both sides glazed may be used. Moreover, the polypropylene material may be replaced by a different material that is resistant to the type of fluid that will be filtered. Even further, although a single layer material is shown here for the bag filter 240, multiple layers or plies can be used. In one contemplated embodiment, two or more plies are used to increase filter efficiency. Regarding the construction of the bag filter 240, a flat sheet of fabric may be cut and sewn into the appropriate shape. Alternatively, the filter may be woven into a tubular shape by use of a sock knitting-type machine using polypropylene fibers and yarn.

Figure 5A:
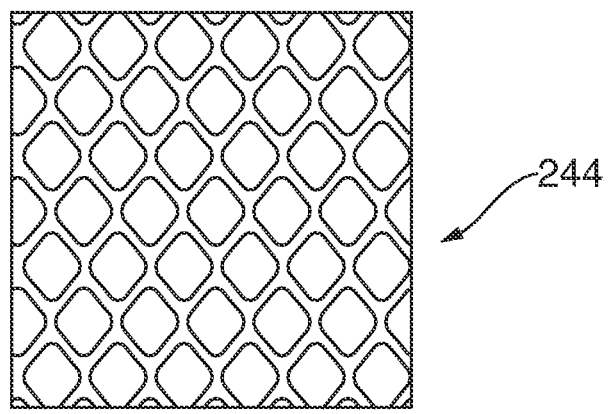
FIGS. 5A and 5B are alternative embodiments for a filter carrier in accordance with the disclosure.
Figure 5B:
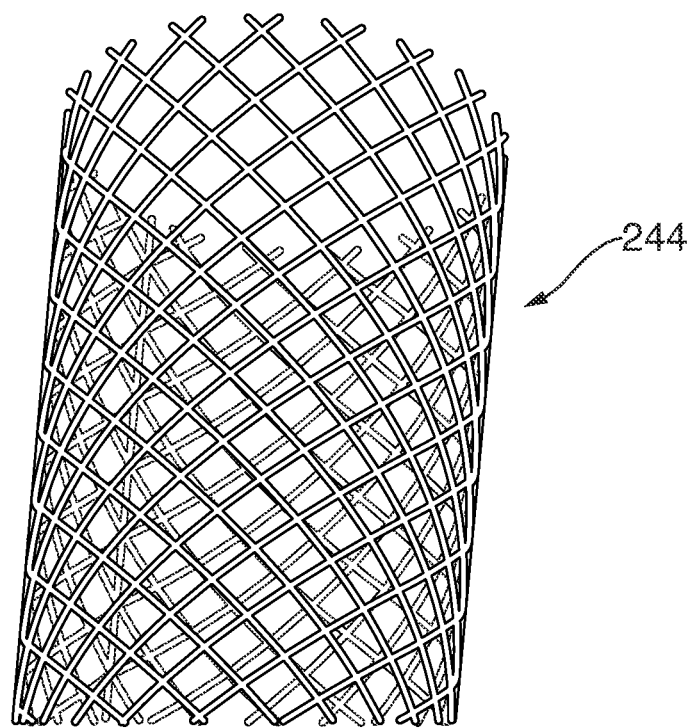

In the illustrated embodiment, the filter carrier 244 has a hollow, generally cylindrical shape that corresponds to the cylindrical shape of the bag filter 240. An outer diameter of the filter carrier 244 is configured to fit within an inner diameter of the bag filter 240 and help the same retain its shape during operation. Because the bag filter 240 in the configuration shown extends over and around the coil 224, the filter carrier 244 need not extend along the entire longitudinal length of the cylindrical bag filter 240 due to the internal support provided by the coil 224. In other words, the filter carrier 244 need only extend along an unsupported longitudinal length of the bag filter 240, which in FIG. 4 is denoted by "X," although longer carriers may be used. Moreover, in configurations where alternative support structures such as the coil 224 are absent, the filter carrier 244 can extend along the entire length of the bag filter 240 and, further, may include an end-cap (not shown) disposed to support an end portion 246 of the bag filter 240 (best shown in FIG. 3). As shown, the filter carrier 244 can be made from extruded plastic or by a woven mesh using plastic fibers. Plastic is used for the carrier in this embodiment instead of metal because of the corrosive nature of some DEF formulations but, depending on the type of DEF or any other fluid that is used in the reservoir, any suitable materials can be used. Two exemplary mesh shapes are shown in FIGS. 5A and 5B, but other types of mesh patterns and/or materials can be used. In general, for DEF reservoirs containing urea, suitable materials can include metals such as Titanium, Ni—Mo—Cr—Mn—Cu—Si—Fe alloys, e.g. hastelloy c/c-276, highly alloyed austenitic Cr—Ni-steels and Cr—Ni—Mo-steels, and stainless steels. Other suitable, non-metal materials include Polyethylene, Polypropylene, Polyisobutylene, Perfluoroalkoxyl alkane (PFA), Polyfluoroethylene (PFE), Polyvinyldenefluoride (PVDF), Polytetrafluoroethylene (PTFE), Copolymers of vinylidenefluoride and hexafluoropropylene.

For mounting and retaining the bag filter 240 within the reservoir volume 204, an inlet collar portion 248 of the bag filter 240 is affixed to the mounting collar 242 by use of a clamp 250. The mounting collar 242 has a clamshell-type, two piece construction that includes a first portion 252 and a second portion 254, which are shown respectively in FIGS. 6 and 7. In reference to these figures, the collar portions 252 and 254 have cooperating lands 256, each having a semicircular shape, which together form a generally cylindrical land that accepts therein the clamp 250 (FIG. 4) that affixes the bag filter 240 to the mounting collar 242. The first and second portions 252 and 254 are connected to one another and are secured by fasteners 241 (FIG. 4) passing through cooperating fastener openings 243. The first and second portions 252 and 254 also include stiffening legs 258 having a generally elongate shape and extending parallel to one another. The legs 258 are optional and are disposed at symmetrical radial locations beneath the lands 256 to provide added support to the filter carrier 244 under certain conditions, for example, when ice fragments floating close to the top of the reservoir volume 204 are colliding with the header assembly 202 while the machine onto which the reservoir 200 is installed may be moving over rough terrain or is changing speeds.

Figure 7:
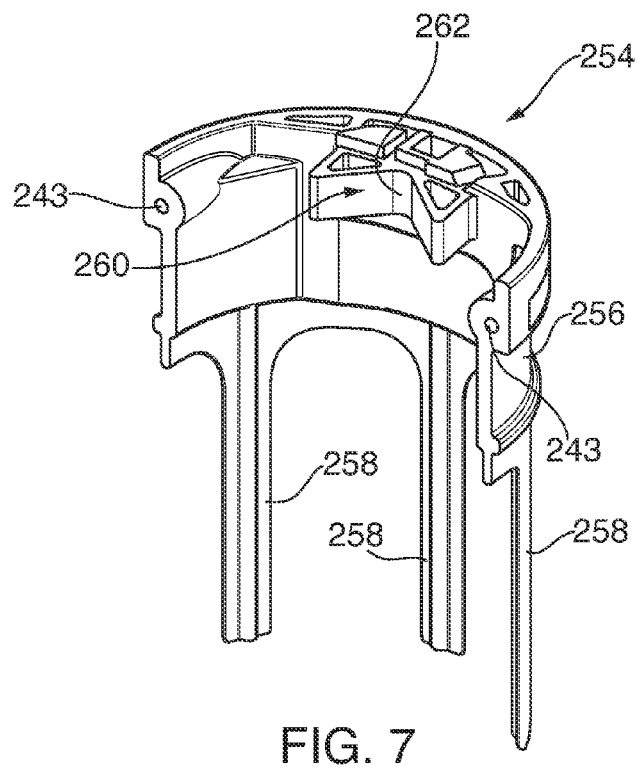
FIG. 7 is an outline view of a second filter header in accordance with the disclosure.
Figure 8:
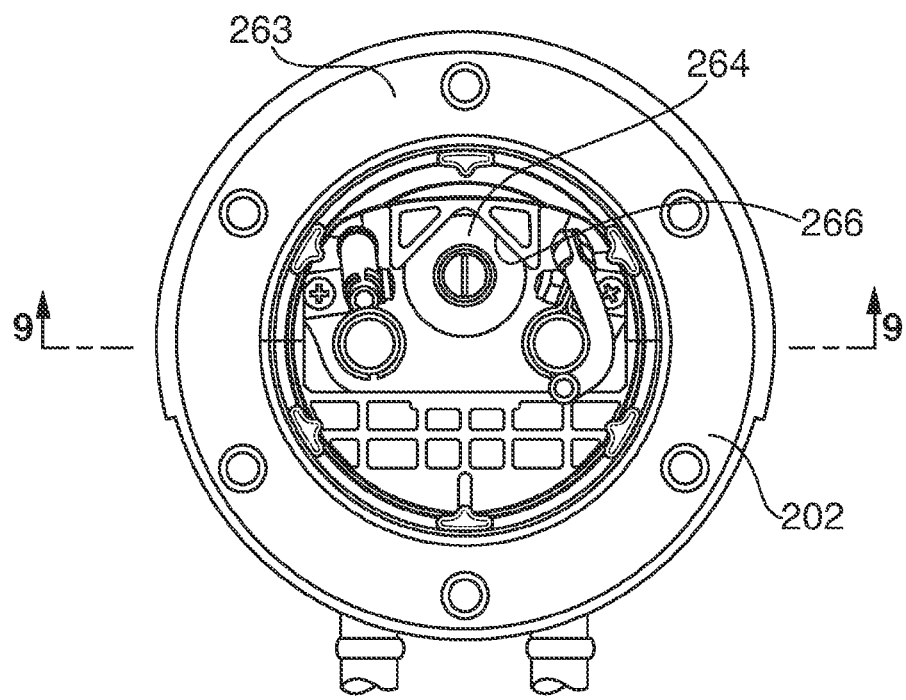
FIG. 8 is a top view of a DEF header assembly in accordance with the disclosure.

For aligning the various components of the header assembly 202, the second portion 254 of the mounting collar 242, or another portion of the collar structure, may include an alignment feature 260, which in the illustrated embodiment (FIG. 7) comprises a V-shaped surface 262 that engages a mating structure 264 on the underside of the top of the DEF header 202 as shown in FIG. 8. In this embodiment, the mounting collar 242 is connected within the perimeter of a mounting flange 263 of the DEF header 202, which can sealably engage a corresponding flange of the reservoir body when mounted, for example, by use of a gasket.

Figure 9:
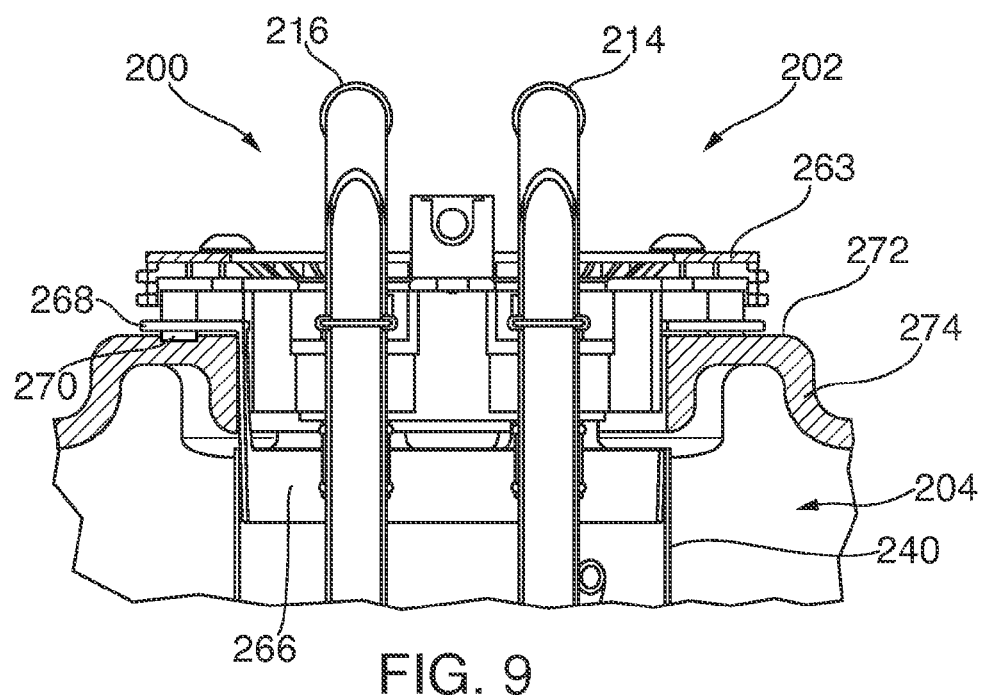
FIG. 9 is a cross section of a DEF header assembly in an as-installed condition.
Figure 10:
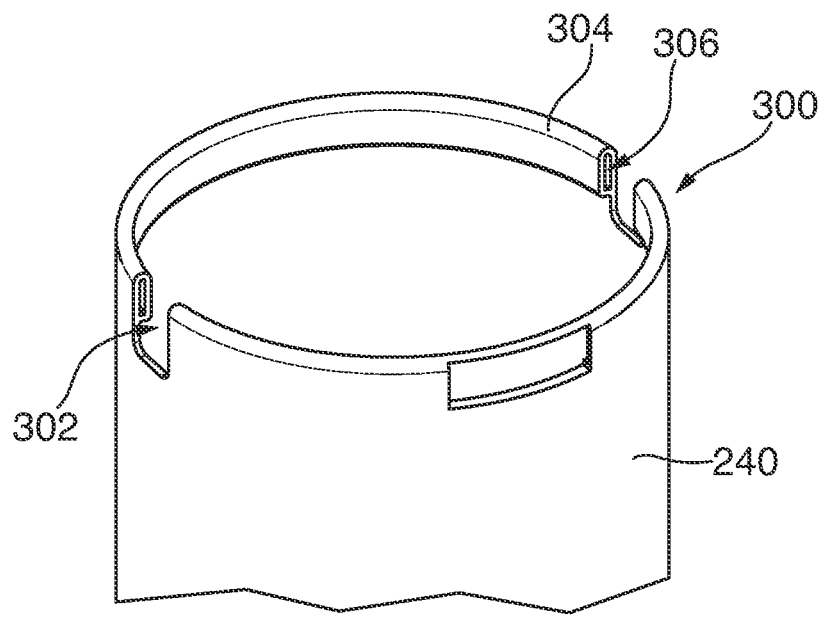
FIG. 10 is a partial outline view of a filter interface for an alternative embodiment in accordance with the disclosure.

An first alternative embodiment for mounting the bag filter 240 within the reservoir 200 is shown in cross section in FIG. 9. Here, the bag filter 240 is fused or otherwise connected to a plastic retainer 266. The retainer 266 has a generally hollow cylindrical shape that forms an outwardly extending, flat, circular flange 268. When installed in the reservoir, the flange 268 is captured between a gasket 270 and the mounting flange 263 of the header 202 onto a corresponding flange 272 formed on a body 274 of the reservoir 200. In this way, the bag filter 240 along with the retainer 266 can be removed and replaced during service.

Figure 6:
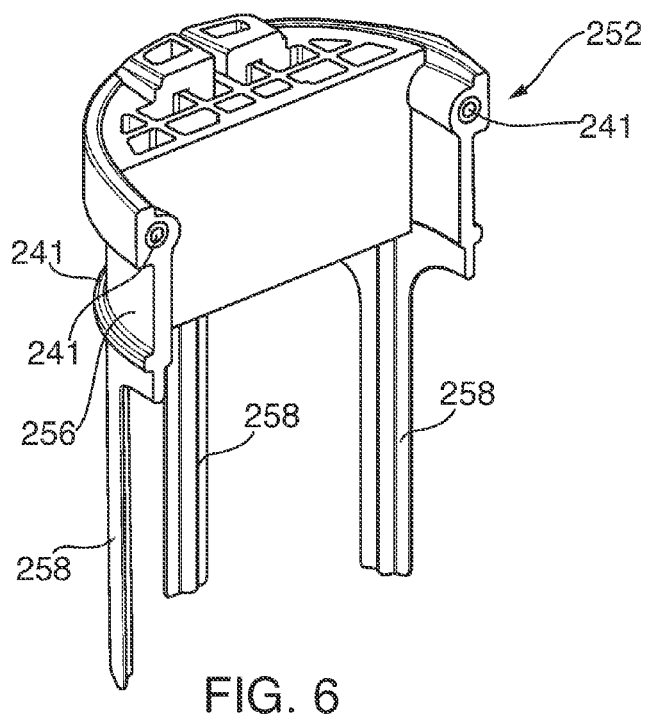
FIG. 6 is an outline view of a first filter header in accordance with the disclosure.

Additional alternative embodiments for releasably connecting the bag filter 240 to the header are shown in FIGS. 10-13. In reference to FIG. 10, the collar portion 300 of a bag filter 240 is shown in enlarged detail and removed from surrounding components for clarity. In this embodiment, the collar portion 300 forms a series of cutouts 302 at radial positions along a circular loop 304. The loop 304, which may be formed by turning over and affixing onto itself the free end of the bag filter 240, defines a slot 306 that can securely accommodate therewithin the band of a worm-style clamp or other clamping device, as those are known in the art. While the clamp (not shown) is inserted in the slot 306, the bag filter 240 can be securely associated therewith and connected to the header, for example, when the clamp is inserted and tightened around a retainer land area such as the land areas 256 (FIGS. 6 and 7). During service, one need only loosen the clamp to remove and clean and/or replace the bag filter with another.

Figure 11:
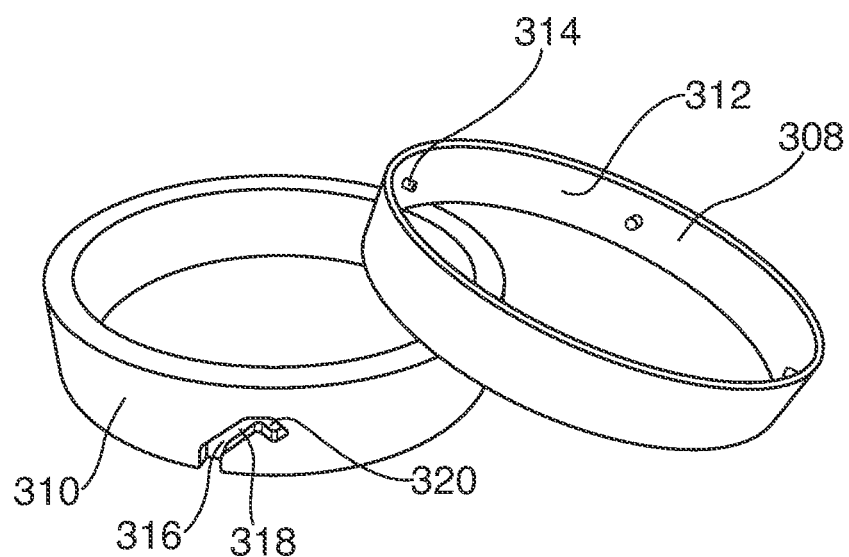
FIG. 11 is an outline view of an alternative embodiment of a filter attachment structure in accordance with the disclosure.

Another alternative embodiment is shown in FIG. 11, where mating collars 308 and 310 are shown together for illustration. The first collar 308 may be fused, adhered or otherwise connected to an open end or mouth of a bag filter (not shown here). The second collar 310, or at least another structure bearing the functional features thereof, may be connected to the header of the reservoir. The first collar 308 has a generally hollow cylindrical shape forming an inner portion 312. A plurality of protrusions or nubs 314 are connected to the inner portion 312 of the first collar such that the nubs 314 extend radially inwardly with respect to the collar periphery. The second collar 310 forms a plurality of channels 316, which correspond in location and size to the nubs 314 of the first collar 308. To install the bag filter to the header, the first collar 308 having the bag filter thereon may be placed peripherally around the second collar 310 such that the nubs 314 are aligned with and enter into their respective channels 316. Each channel 316 has a ramp portion 318 and a locking portion 320 such that, when each nub 314 is inserted into its respective channel 316 and the first collar 308 is rotated relative to the second collar 310, the nub 314 follows the channel 316 along the ramp portion 318 and transitions and rests into the locking portion 320, thus securing the bag filter to the header. For service, one may rotate the first collar 308 in a reverse direction to release the filter from the header for cleaning and/or replacement.

Figure 12:
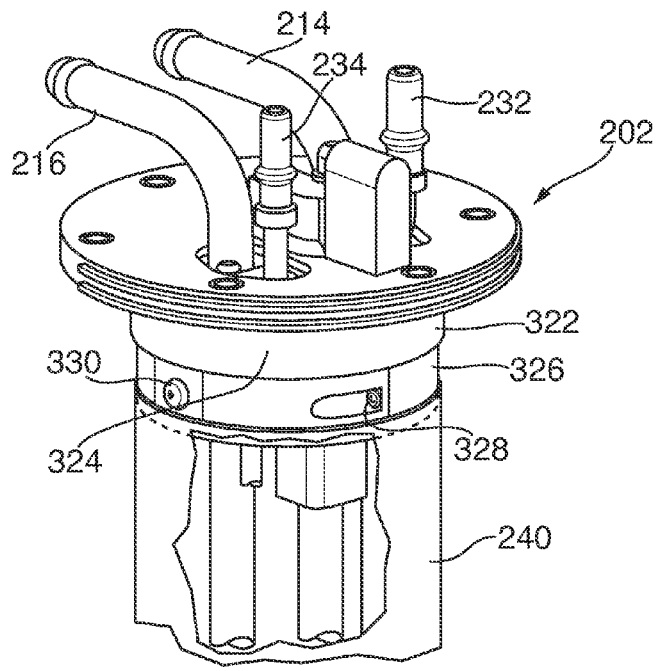
FIG. 12 is an alternative embodiment for a filter mounting structure in accordance with the disclosure.

Another alternative embodiment is shown in FIG. 12. Here, a body portion of the header 202 forms a mounting portion 322. A filter retainer collar 324 is made of two clamshell semicircular segments 326 connected to one another to form a ring via fasteners 328. The ring-shaped filter retainer collar 324 is connected, adhered, fused or otherwise mechanically engaged with the bag filter 240 and is secured to the mounting portion 322 of the body portion of the header by fasteners 330. In this way, during service, the entire assembly of the bag filter 240 and the ring retainer collar 324 can be removed from the header 202 for replacement of the filter 240 and/or the collar 324.

Figure 13:
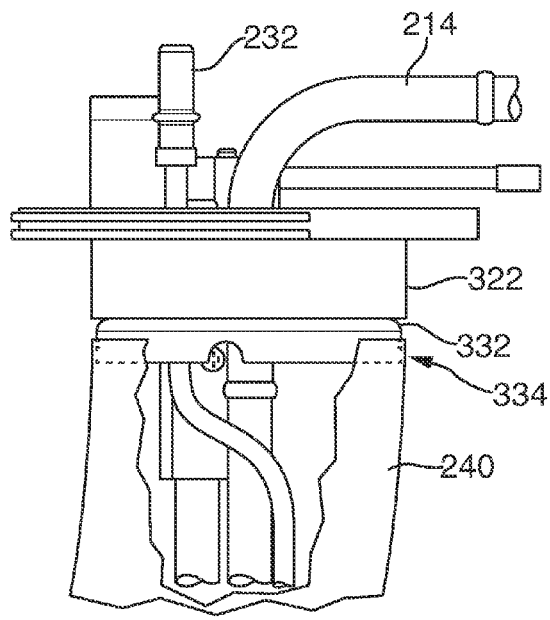
FIG. 13 is an alternative embodiment for a filter mounting structure in accordance with the disclosure.

Another alternative embodiment is shown in FIG. 13. Here, the mounting portion 322 of the header 202 is connected to a receptor 332 that forms a peripherally extending groove 334 therein that extends around the mounting portion 322 of the header 202. The groove 334 is configured to accept therein an o-ring or other annularly-shaped structure that is associated with and connected around a mouth opening of the bag filter 240 such that an interference fit is created when the o-ring is disposed within the groove 334, thus retaining the bag filter 240 to the header 202. In this embodiment, removal and replacement of the bag filter 240 can advantageously be accomplished without removing fasteners and the like.

Figure 14:
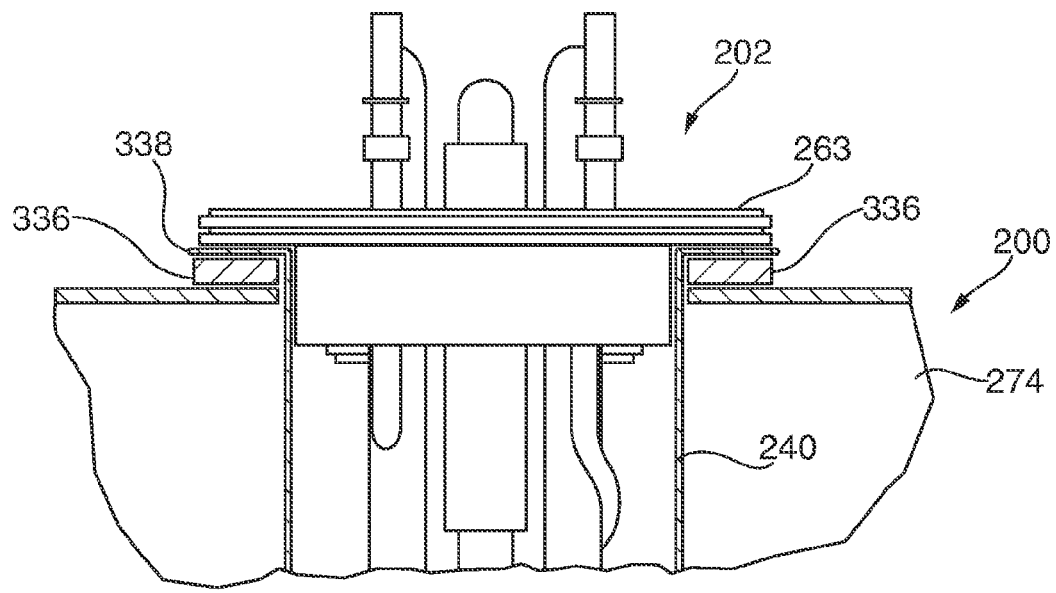
FIG. 14 is an alternative embodiment for a filter mounting structure in accordance with the disclosure.

Another alternative embodiment is shown in FIG. 14. In this embodiment, a portion of the wall of the reservoir 200 is shown where the flange 272 is formed on the body 274. The mounting flange 263 of the DEF header 202 is disposed to sealably engage and capture the bag filter 240 against the flange 272. In this embodiment, a filter flange 336 is fused with an annular flange-like extension 338 of the bag filter 240 such that the filter flange 336, and the integrated filter protrusion 338, as a single structure, is/are sealably captured and retained between the DEF header 202 and the reservoir 200. In this way, sealable connections are formed between the DEF header 202 and the protrusion 338, the protrusion 338 and the filter flange 336, and the filter flange 336 and the reservoir 200. In this embodiment, removal and replacement of the bag filter 240 involves replacement of the integrated filter flange 336, both of which can advantageously be accomplished by removing the DEF header 202 from the reservoir 200.

Figure 15:
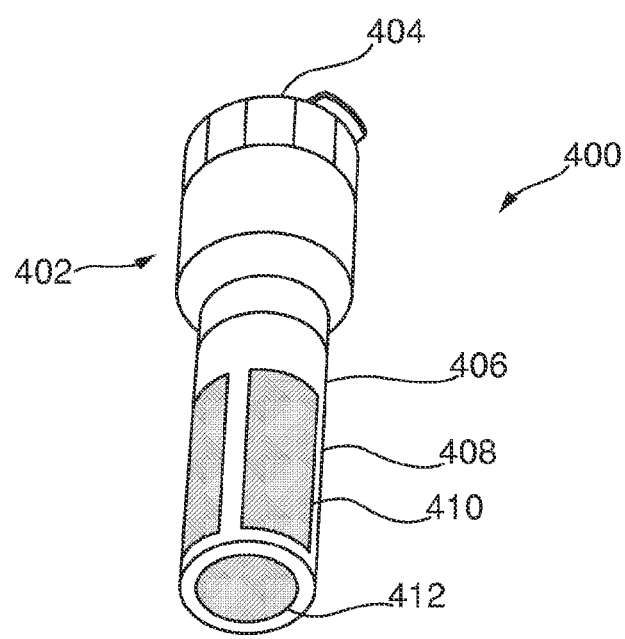
FIG. 15 is an inlet filter in accordance with the disclosure.

An inlet screen or fill opening filter device 400 is shown in FIG. 15. The fill opening filter device 400 may be used at the inlet opening of the reservoir 200 to screen, filter or otherwise prevent foreign matter from entering the reservoir 200 during a filling operation. The fill opening filter device 400 includes a fill neck portion 402 covered by a lid 404. The fill neck portion 402 may be disposed within or outside the reservoir 200 and act as a funnel for directing fluid added thereto into the interval volume or cavity of the reservoir 200. When not in use, or during service, the lid 404 covers the reservoir opening.

Figure 16:
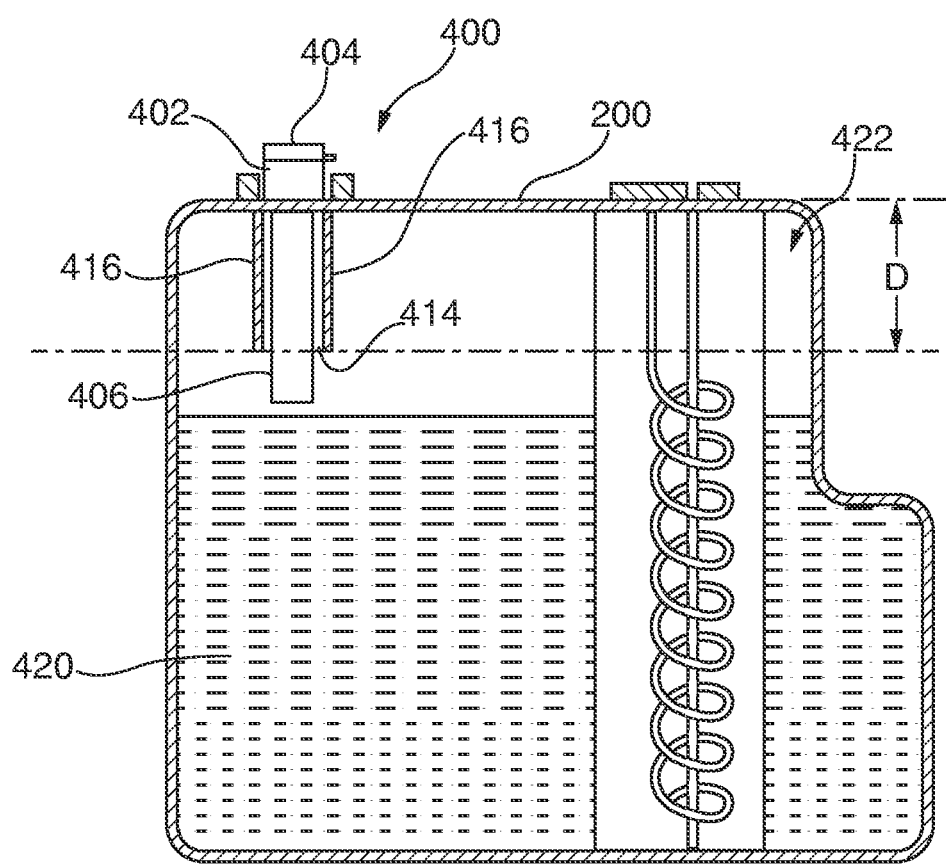
FIG. 16 is an embodiment for a fluid reservoir in accordance with the disclosure.

In the illustrated embodiment, the fill opening filter device 400 includes a cage 406 that is configured to extend within the internal space of the reservoir, as is shown in FIG. 16. The cage accepts fluid added to the reservoir through the fill neck portion 402. The cage 406 forms windows 408 that are covered by screens 410 that filter fluid passing from the fill neck portion 402, into the cage 406, and through the windows 408 and screens 410 before entering the reservoir 200. A bottom screen 412 may be added to increase the flow area through the cage 406 and facilitate the quick filling of the reservoir. In one embodiment, the screens 410 may have a mesh that is appropriately sized to act as a strainer to capture rocks and other, finer debris that may be present around or on the lid 404 in the field such as coal dust, dirt particles, landfill fibers or other landfill material and the like. As shown, the screens 410 and 412 may be sized to have flow openings therethrough of between about 100 to 250 µm.

To further facilitate the expedient filling of the reservoir 200, in the installation shown in FIG. 16, an air gap or fill-vent opening 414 may be provided. In the illustrated embodiment, the fill-vent opening 414 is formed by a gap provided between inner and outer cylindrical walls 416 and 418 that are concentrically disposed within the fill opening of the reservoir 200. As shown, the inner and outer walls 416 and 418 extend at the same distance, D, within the reservoir 200 to define a maximum reservoir fill level. In this way, when the fluid 420 reaches the fill level at the height D below the top wall of the reservoir 200, the venting will cease and the operator will know that the reservoir has been filled to capacity. The desired fill level of the reservoir may be selected on numerous parameters such as reservoir capacity and the like, and may also provide a free space 422 at the top of the reservoir to account for fluid expansion due to heating and/or freezing without damaging the reservoir walls.

Figure 17:
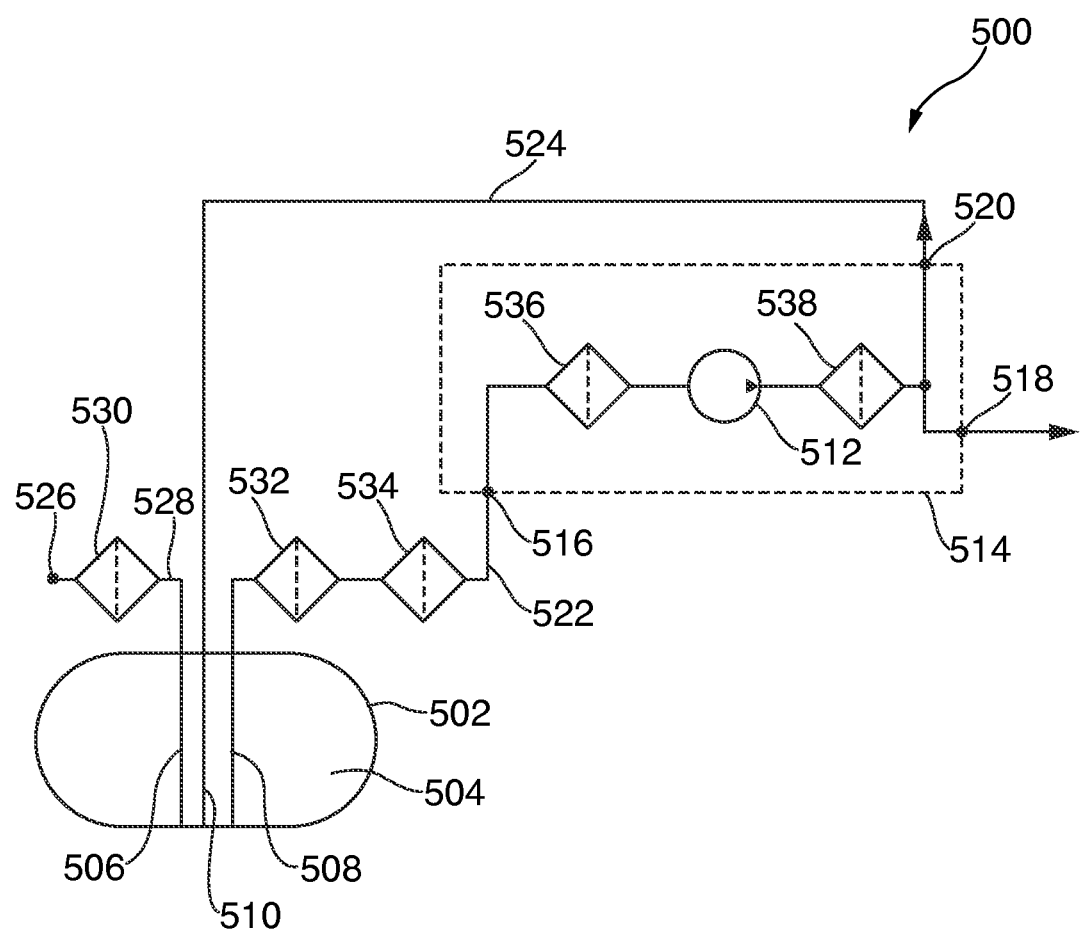
FIG. 17 is an embodiment for a fluid delivery system in accordance with the disclosure.

A fluid delivery system 500 in accordance with the disclosure is shown in FIG. 17. The fluid delivery system 500 may be a system for storing and delivering DEF in a vehicle and includes various filtration stages that can effectively remove debris, ice and other particles from the system. The fluid delivery system 500 in the illustrated embodiment includes a reservoir 502 that is closed or vent-less during operation. The reservoir 502 forms an internal cavity 504 for containing a fluid such as DEF. Three fluid conduits or passages communicate with the internal cavity 504. These are an inlet conduit 506 for filling the reservoir, an outlet or supply conduit 508 for evacuating or drawing fluid from the reservoir, and a return conduit 510 for returning unused fluid to the reservoir.

The system further includes a pump 512 mounted within a pump housing 514 that forms an inlet opening 516, an outlet opening 518 and a return opening 520. The pump 512 may be the pump 126 (FIG. 1). In the illustrated embodiment, the pump inlet opening 516 is connected to the supply conduit 508 via a supply passage 522. Similarly, the return opening 520 is connected to the return conduit 510 via a return passage 524. During operation, the pump 512 may draw working fluid from the reservoir 502, which may be metered and/or pressurized and provided to the outlet port 518 for delivery to another device or system, for example, a DEF injector such as the injector 122 (FIG. 1). In the illustrated embodiment, the pump 512 is configured as a dosing pump such that only a metered amount is delivered to the receiving system. Any fluid drawn from the reservoir that remains unused is returned to the reservoir via the return passage 524. To replenish the fluid in the reservoir, fluid may be periodically added to the reservoir from a fill opening 526 that is connected to the fill port 506 via a fill passage 528.

The system 500 advantageously includes various filters, screens and other fluid cleaning devices arranged to protect various system components from damage or contamination by debris that may be present with the fluid in the system. In the illustrated embodiment, various filters are shown that are associated with the reservoir and the pump. Specifically, an inlet screen 530 is used to intercept possible contaminants entering the reservoir 502 when the fluid therein is replenished. One example of the inlet screen 530 is the fill opening filter device 400 shown in FIG. 15. As can be appreciated, although the inlet screen 530 is shown external to the reservoir, the illustration is schematic such that the system can include the inlet screen within the reservoir, as is the case with the fill opening filter device 400 shown in FIG. 16. Moreover, to promote the expedient filling of the reservoir, the inlet screen 530 may have a relatively large porosity, for example, in the range between about 100 to 250 µm, which has been found sufficient to exclude larger debris particles from the reservoir while promoting the expedient filling of the reservoir.

For filtering fine debris that may pass through the inlet screen 530 before the fluid from the reservoir is provided to the pump 512, the system 500 further includes a series of filters, each performing a different task. As shown in FIG. 17, fluid drawn from the reservoir enters the supply conduit 508 and passes through a main reservoir filter 532. The main reservoir filter 532 may have a porosity of between about 5 to 10 µm and may be disposed within the reservoir volume 504. One example of a suitable main reservoir filter 532 is the bag filter 240, as shown in FIG. 3. As can be gleaned from the configuration shown in FIG. 3, the main reservoir filter 532 may be disposed within the reservoir and may further enclose other components such as a secondary filter, the inlet port for fluid drawn from the reservoir, a heater, a level sensor, and other components that may be sensitive to debris contamination.

In the embodiment illustrated for the system 500, a secondary reservoir filter 534 is disposed after the main reservoir filter 532. The secondary reservoir filter 534 may be the inlet screen 219, which prevents ice particles of filtered fluid from entering the fluid draw line or conduit and plugging the same before the fluid in the reservoir has fully thawed during cold operating conditions. When fluid enters the pump housing, it may pass through an additional inlet screen 536 having a porosity of about 90-100 µm. The additional inlet screen 536, although possibly redundant for the entire system 500, may be useful in preventing debris present in the conduits before and/or after assembly of the system 500 from entering the pump 512, and may further prevent entry of ice present in the supply conduit 522 downstream of the filters 532 and 534 from plugging, at least temporarily, the working portions of the pump 512. The pump housing 514 may further include a main pump filter 538 configured to filter the main fluid outlet supply of the pump. The main pump filter 538 may have a porosity in the order of about 10 μm. Additional and/or optional filters and screens may be added to the system in addition or instead of those shown and described relative to the system 500 as shown in FIG. 17.

INDUSTRIAL APPLICABILITY

The present disclosure is applicable to emission control systems for engines and, more particularly, to emission control systems using SCR processes requiring the injection of urea-based water solutions into engine exhaust streams. In the disclosed embodiments, a two-stage filtering arrangement for a feed of DEF from a reservoir is described, which is advantageously configured to provide sufficient protection from debris, such as silt, dirt, fibers and the like, or transient debris such as ice, from entering into a pumping system and/or otherwise clogging DEF flow passages out from the reservoir.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A diesel exhaust fluid (DEF) reservoir for use with an exhaust after-treatment system of an internal combustion engine, the DEF reservoir comprising:
   a reservoir body forming a reservoir volume and a header opening that is fluidly open to the reservoir volume;
   a header connected to the reservoir body and disposed to seal the header opening;
   a heater connected to the header and disposed within the reservoir volume and adapted to be immersed in the DEF;
   a DEF draw conduit connected to the header and extending through the header between a sump location, the sump location being within the reservoir volume and adjacent to the heater, and a DEF draw port disposed external to the reservoir body and fluidly connected to a DEF pump;
   a bag filter connected to the header, the bag filter completely enclosing the heater and the sump location of the DEF draw conduit within the reservoir volume such that, when DEF is drawn from the reservoir volume through the sump location, said DEF is first filtered by the bag filter;
   a secondary reservoir filter disposed within the bag filter and arranged to cover the DEF draw port at the sump location;
   and a fill opening screen disposed to cover a fill opening formed in the reservoir body.

2. The DEF reservoir of claim 1, wherein the fill opening screen is integrated with a filter device disposed within the fill opening of the fluid reservoir, the filter device comprising:
   a fill neck portion formed in a body of the device, the fill neck portion disposed in fluid communication with the reservoir volume;
   a fill cap arranged to cover an open end of the fill neck portion;
   a cage forming at least one window connected to the body, the at least one window being fluidly disposed between the reservoir volume and the open end of the fill neck portion; and
   at least one screen disposed to cover the at least one window such that fluid entering the open end of the fill neck portion must pass through the at least one window and be filtered thereby before entering the reservoir volume.

3. The DEF reservoir of claim 2, wherein the reservoir body further comprises:
   an inner wall formed by the reservoir body and surrounding the fill opening, wherein the filter device is disposed within the inner wall;
   an outer wall formed by the reservoir body and surrounding the inner wall at a distance therefrom to form a gap therebetween;
   wherein the gap is configured as a vent to facilitate expedient filling of the reservoir volume with fluid, and
   wherein the inner and outer walls extend within the reservoir volume by a distance such that the reservoir volume can only be filled up to a level that is equal to the distance.

4. The DEF reservoir of claim 1, wherein the bag filter surrounds a fluid level sensor connected disposed within the reservoir volume.

5. The DEF reservoir of claim 1, further comprising a DEF pump fluidly connected to the fluid reservoir and arranged to draw DEF from the DEF reservoir through the DEF draw conduit through a supply passage and to return unused fluid to the DEF reservoir through a return passage, the pump including an inlet screen disposed fluidly along the supply passage and a main pump filter disposed fluidly along the return passage.

* * * * *